Nov. 4, 1952  C. H. DAVY ET AL  2,616,256
GAS TURBINE PLANT USING SOLID ASH-CONTAINING FUEL
Filed Sept. 11, 1947  3 Sheets-Sheet 1
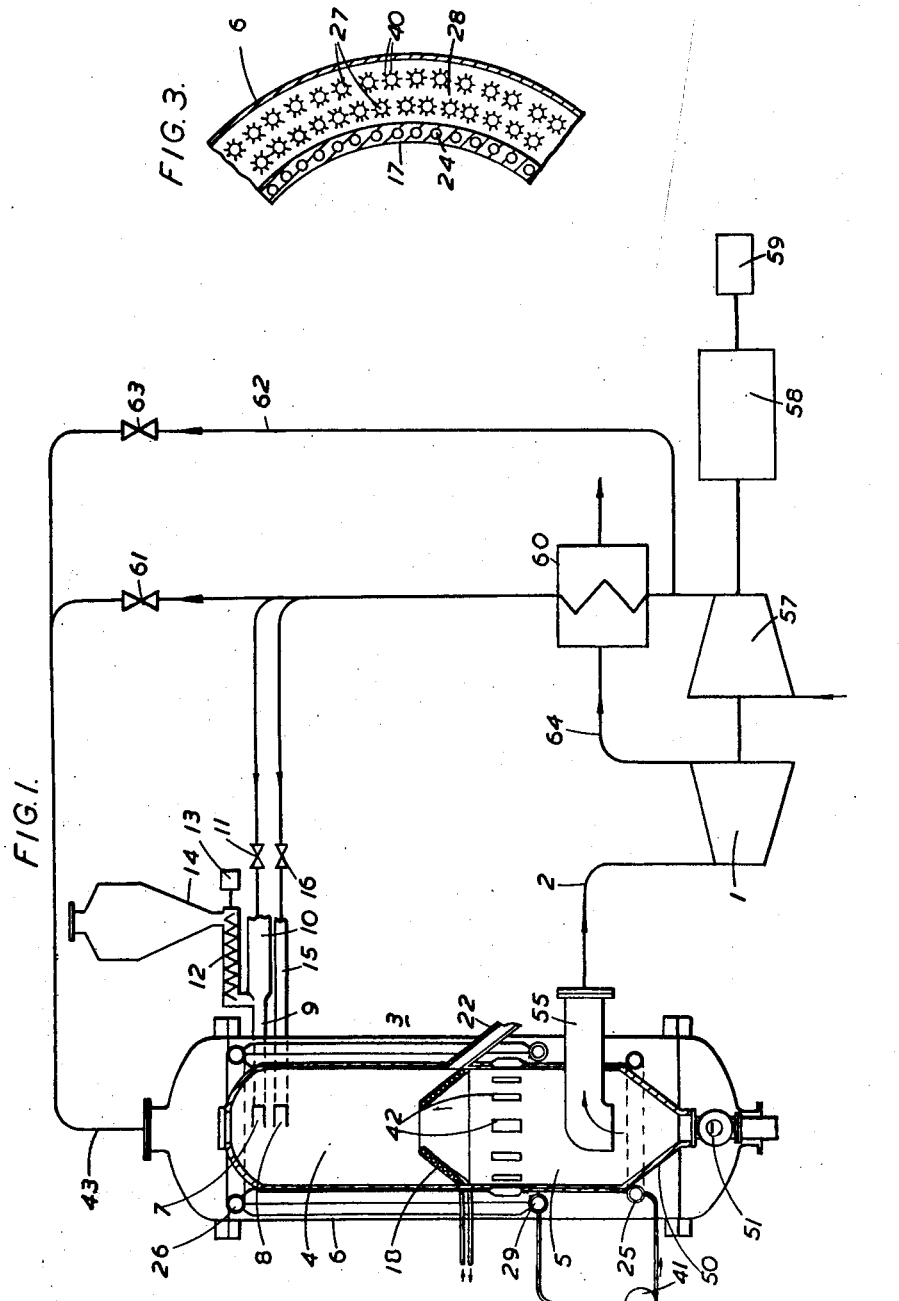
INVENTORS
Christopher H. Davy
& Thomas B. Webb
BY
R. M. Holbrook  ATTORNEY

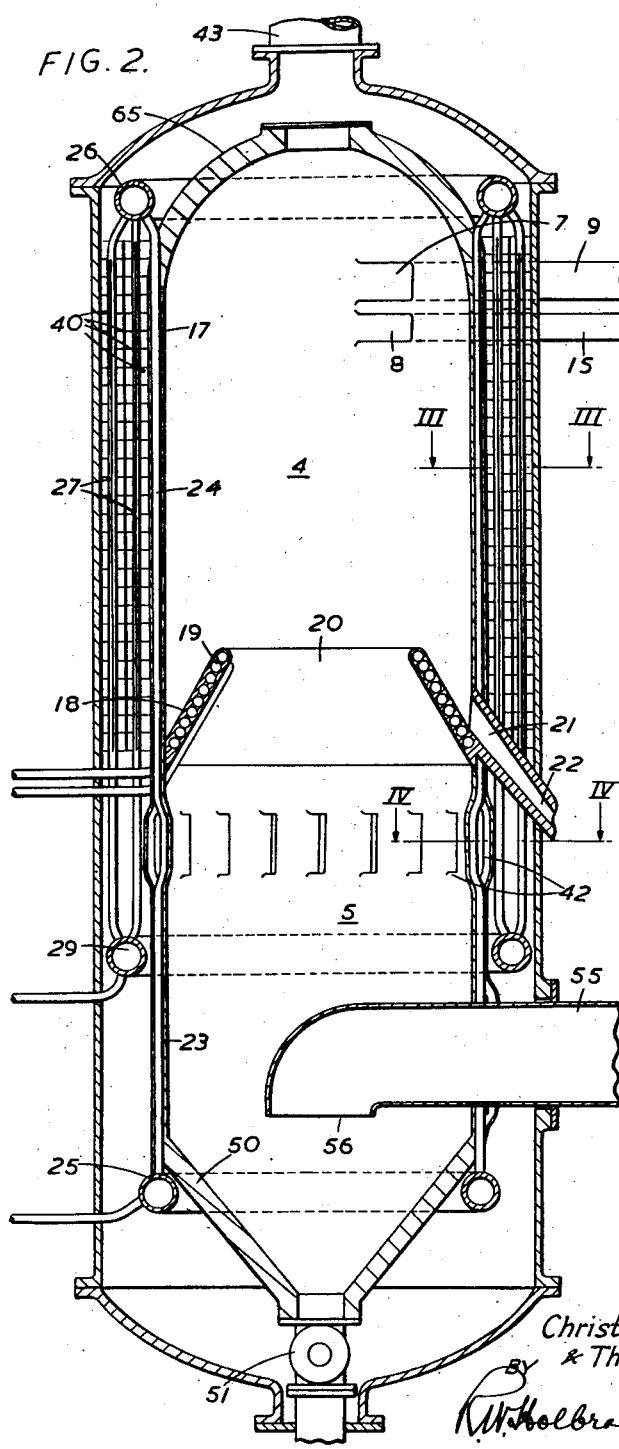

Nov. 4, 1952     C. H. DAVY ET AL     2,616,256
GAS TURBINE PLANT USING SOLID ASH-CONTAINING FUEL
Filed Sept. 11, 1947     3 Sheets-Sheet 3
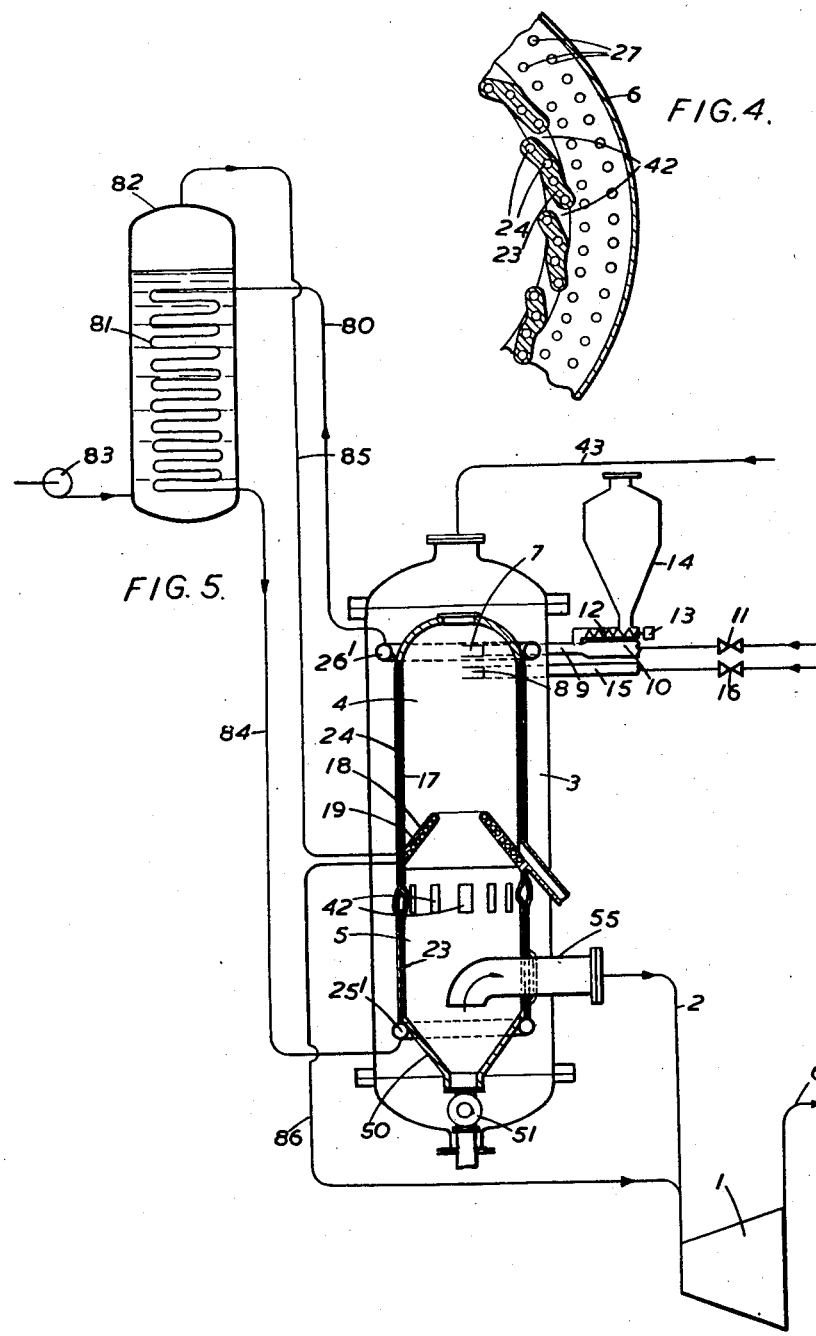
INVENTORS
Christopher H. Davy
& Thomas B. Webb
BY
*W. Holbrook* ATTORNEY Patented Nov. 4, 1952

2,616,256

UNITED STATES PATENT OFFICE 2,616,256

GAS TURBINE PLANT USING SOLID ASH-CONTAINING FUEL

Christopher Humphrey Davy and Thomas Basil Webb, London, England, assignors to The Babcock & Wilcox Company, Rockleigh, N. J., a corporation of New Jersey Application September 11, 1947, Serial No. 773,396
In Great Britain September 16, 1946

9 Claims. (Cl. 60—39.46)

This invention relates to gas turbine plant and particularly to methods of and means for the production of motive fluid for gas turbines, and an object of the invention is to provide for the operation of a gas turbine plant on a solid ash-containing fuel and with relatively few entrained particles in the gases led to the turbine. A further object is to ensure, with the combustion of a solid ash-containing fuel, efficient and rapid supply of suitable turbine-driving gases under pressure. Another object is to provide an improved pressure combustion unit for burning a solid ash-containing fuel and adapted for use in a gas turbine plant.

The invention includes the method of operating gas turbine plant on a solid ash-containing fuel which comprises burning under pressure and at a high temperature fuel introduced in solid granular form into a combustion space in which a whirling of the gaseous contents is effected, removing furnace gases from the combustion space separately from molten ash thrown centrifugally to the combustion space walls, tempering the removed furnace gases by the addition of gaseous fluid supplied under pressure and in quantity sufficient to solidify ash remaining in the furnace gases, and separating ash in solid state from the gases before supplying the gases to a gas turbine.

The invention also includes the method of operating gas turbine plant which includes providing ash-containing solid fuel in granular form, centrifuging the fuel in a furnace operating under pressure and at a high temperature so that fuel is thrown against a surface sticky with molten ash, collecting molten ash from the surface, withdrawing the collected, molten ash from the furnace and delivering the furnace gases freed from the collected, molten ash and at suitable temperature to a gas turbine.

The invention furthermore includes gas turbine plant adapted to operate on a solid ash-containing fuel, comprising a whirl chamber arranged for combustion of fuel therein under pressure and at a high temperature and having a refractory-lined, fluid cooled circumferential wall, means arranged to introduce fuel in solid granular form for combustion in the chamber, means for effecting a circumferential whirling of gaseous contents of the combustion chamber, means for removing furnace gases from the combustion chamber separately from molten ash deposited on the wall, and means for conducting them to the inlet to a gas turbine.

The invention moreover includes in or adapted for use in gas turbine plant a pressure combustion unit comprising a combustion whirl chamber adapted for the burning of fuel in solid granular form under pressure and at a high temperature and having a refractory-lined, fluid-cooled circumferential wall, means for directing granular fuel and combustion air with a tangential component of motion into the combustion chamber to effect a circumferential whirling of gaseous contents of the combustion chamber, together with an extension forming a secondary whirl chamber adapted to separate solid ash and means for introducing a whirling stream of tempering gaseous fluid into the secondary whirl chamber.

The fuel in the granular form referred to above, provided for combustion, comprises a mixture of fuel particles not greater in size than $\frac{1}{2}''$, all or the vast majority being less in size than $\frac{1}{8}''$, but the mixture is coarse as compared with normal pulverized fuel used for firing a steam boiler furnace, of which the greatest percentages is fines. Thus the granular mixture is such that the proportion thereof that would be retained by a No. 25 (British fine mesh) screen is considerably higher than the proportion of such pulverized fuel that would be retained by a No. 25 mesh screen, and for instance may be such that a proportion of the granular mixture of the order of 50% or more would be retained by a No. 25 mesh screen. Again, a proportion of fines, such as are able to pass a No. 200 (British fine mesh) screen, may be necessary or desirable in the granular fuel mixture in order to aid ignition and promote combustion of fuel entering the combustion chamber but the granular fuel mixture is to be such as to include only a low proportion of such fines, if possible considerably less than 20%.

The invention will now be described, by way of example, with reference to the accompanying drawings, in which:

Figure 1 is a schematic representation of the layout of a gas turbine plant;

Figure 2 is a side elevation in section through the axis of a vertical cylindrical pressure combustion unit forming an element of the plant shown in Figure 1, but to a larger scale;

Figures 3 and 4 are cross-sectional plan views of sections of the unit shown in Figure 2, taken on the lines III—III and IV—IV respectively of that figure; and Figure 5 schematically represents a modification of the arrangement of Figure 1.

Referring to Figures 1 to 4 of the drawings, the gas turbine 1 of the plant is driven by gases led thereto by a gas conduit 2 from a pressure combustion unit 3 arranged for the combustion of coal in granular form. The combustion unit 3 includes a primary cylindrical whirl chamber 4 adapted for combustion of the coal introduced thereinto and arranged with its axis vertical and, formed as a downward extension thereof, a secondary cylindrical whirl chamber 5 for tempering combustion gases from the primary whirl chamber. Surrounding the whirl chambers and spaced therefrom is a cylindrical metal pressure casing 6.

Near the top of the primary whirl chamber 4 tangentially arranged inlet ports 7 and 8 are provided for the introduction of streams respectively of granular coal with primary air and of secondary air. A fuel duct 9 leading to the upper port 7 is supplied with primary air from a primary air duct 10 provided with control means 11, and with granular coal by a screw conveyor 12 driven by a motor 13 and arranged to remove coal from below a coal reservoir 14 and to discharge it so as to be entrained by the primary air stream entering the fuel duct 9. A secondary air duct 15 leading to the lower port 8 is supplied with secondary air and is provided with control means 16.

Extending upwardly and inwardly from the bottom of the cylindrical wall 17 of the primary whirl chamber is a wall 18 of a frusto-conical form which acts to form a trap for molten ash. The wall 18 is formed of refractory cooled by a flow of water under pressure or other high-boiling point fluid in a tube 19 which is wound in the wall spirally inwardly and helically upwardly to leave a throat 20 for the passage of gases downwardly from the primary whirl chamber, the tube being led from the rim of the wall downwardly adjacent the lower surface of the wall to an outlet. At the bottom of the wall 17 an aperture 21 at one side thereof allows for the discharge of molten ash from the primary whirl chamber, a spout 22 being provided to lead the discharged molten ash to a suitable extraction chamber arranged for ash removal with maintenance of combustion chamber pressure.

The walls 17 and 23 of the primary and secondary whirl chambers respectively are lined with refractory and fluid cooled by the aid of a cylindrical row of tubes 24 which support the refractory and extend from an annular inlet header 25, disposed below the cylindrical wall 23 of the secondary whirl chamber, vertically upwardly to an intermediate annular header 26 disposed above the cylindrical wall 17 of the primary whirl chamber. Two cylindrical rows of tubes 27 extending vertically in the annular space 28 between the casing 6 and whirl chamber walls 17 and 23 connect the intermediate header 26 to an annular outlet header 29 located in the annular space 28 outside the wall 23 and above the header 25. The tubes 27 are provided above the level of the bottom of the primary whirl chamber with extended surface elements in the form of ribs 40. From the outlet header 29 a connection leads to the inlet of a pump 41 the outlet of which is connected to the inlet header 25. The wall tube fluid consists of water under pressure or a high boiling point fluid and a pressure relief valve and liquid renewing means may be provided for the closed circuit of the wall tube fluid.

In the upper part of the secondary whirl chamber 5 above the level of the header 29 some of the tubes 24 in the wall 23 are bent to provide a circular series of ports 42 formed to give a whirling motion, in the same sense as the whirling motion in the primary whirl chamber, to tempering air introduced therethrough. Such tempering air is provided through an air duct 43 connected to the pressure casing at the top thereof, whence it flows to the ports 42 downwardly in the annular space between the casing and the wall 17.

The lowermost part of the secondary whirl chamber is formed as a hopper 50 for the collection of solidified ash and a valve 51 allows for the discharge of such ash when desired into a suitable receptacle arranged for ash removal with maintenance of whirl chamber gas pressure.

Above the hopper 50 a gas outlet duct 55 extends laterally from within the secondary whirl chamber to the outside of the pressure casing for conveying gas to the duct leading to the gas turbine 1. The gas inlet mouth 56 to the gas outlet duct 55 is disposed on the whirl chamber axis and is arranged for the upward flow of gas therethrough into the outlet duct.

The gas turbine is mechanically coupled to an air compressor 57, an electrical generator 58, and a starting motor 59. The air compressor supplies air under pressure which after being heated in a regenerator 60 passes as primary air to the primary air duct 10, secondary air to the secondary air duct 15, and under the control of control means 61 to the tempering air duct 43. An air duct 62 provided with control means 63 leads pressure air from the compressor to the tempering air duct 43 without passing through the regenerator 60 or the control means 61. A gas duct 64 leads gases from the exhaust of the turbine for passage through the regenerator and for transfer of heat to the air.

The gas turbine plant described is adapted for operation upon an ash-containing coal reduced by crushing as in a hammer mill type coal crusher to a granular form such for instance in the case of bituminous coal, as will consist of particles substantially all less than ⅛" in size and will have a minimum of fines, about 10% only or less passing through a No. 200 mesh screen. The coal, the preheated primary air under pressure, and the preheated secondary air under pressure are in operation introduced into the primary whirl chamber in such quantities and at such speed that a high combustion temperature and a high centrifugal force results, under which conditions, in continuous operation there is formed on the cylindrical whirl chamber wall 17 an adherent molten ash film providing a sticky surface by which fuel granules centrifugally flung thereonto are retained and on which they are burnt out under the action of the whirling gases sweeping thereover. Ash in the ash film flows downwardly by gravity until it is trapped by the frusto-conical wall 18.

The gases whirling in the primary whirl chamber advance generally downwardly therein and pass through the throat 20 into the secondary whirl chamber 5 where their temperature is reduced by the tempering air introduced with a whirling motion through the apertures 42 and ash particles conveyed into the secondary whirl chamber are solidified. The whirling gases in the secondary whirl chamber flow generally downwardly to below the outlet duct 55, whence they flow inwardly and upwardly to enter the mouth 56 of the duct. As a result of centrifugal action in the secondary whirl chamber, the initial downward flow, and the changes in direction to which the gases are subject, solid ash particles are deposited in the hopper 50 at the bottom of the chamber.

Heat received from the whirl chambers by fluid flowing upwardly in the tubes 24 in the whirl chamber walls 17 and 23 is transmitted to the tempering air by the fluid flowing downwardly in the two rows of tubes 27 arranged in the annular space 28 in which the tempering air flows and provided with the ribs 40. Tempering air also flows in contact with and cools the outside of the wall 17 and the outside of the roof 65 of the primary whirl chamber.

From the combustion unit of the plant there flow, as motive fluid for the turbine, gases, containing heat released by the combustion of solid ash-containing fuel, which are relatively free from entrained particles, and which are rapidly and efficiently supplied at a suitable temperature and pressure.

Figure 5 schematically represents a modification of the arrangement described with reference to Figures 1 to 4, in which modification provision is made for supplying to the gas turbine vapour under pressure generated by heat absorbed by the wall tubes of the whirl chambers. In Figure 5, parts indicated by the same reference numerals as in Figures 1 to 4 have the same construction and function as in the arrangement according to those figures. The tubes 24 arranged in the cylindrical walls 17 and 23 of the whirl chambers contain water under pressure or a high boiling point fluid and extend from an annular inlet header 25' below the wall 23 of the secondary whirl chamber to an annular outlet header 26' above the wall 17 of the primary whirl chamber. From the outlet header the fluid is led in a connecting pipe 80 to tubular heat exchange surface 81 in a separate pressure vessel 82 to which water under pressure or other suitable vapour producing fluid is supplied by a pump 83. From the tubular heat exchange surface 81 a discharge pipe 84 leads cooled or condensed liquid to the inlet header 25'. A relief valve and means for renewing liquid are provided for the closed fluid circuit through tubes 24, connection 80, heat exchange surface 81 and discharge pipe 84, together, if necessary, with a circulating pump.

The liquid forced by the pump 83 into the pressure vessel 82 is vaporised by the heat received from the heat exchange surface 81 and is led in the pipe connection 85 and passed through the tube 19 cooling the frusto-conical wall 18 acting as the molten ash trap, in which tube it is superheated. The superheated vapour is then conveyed by a discharge pipe 86 and delivered into the gas stream flowing in the gas duct 2 from the pressure combustion unit 3 to the gas turbine 1.

The vapour generated in the pressure vessel 82 may in a modification be used for other suitable purposes instead of being added to the gases flowing to the turbine.

The connecting of the wall tubes 24 in a closed fluid circuit as shown both in the arrangement of Figure 1 and that of Figure 5, provides the advantage that the fluid may be so selected or so treated as to avoid or minimize scaling and corrosive effects in spite of high fluid temperatures in the wall tubes of the combustion chamber 4.

We claim:

1. The method of burning a solid ash-containing fuel to provide motive fluid for a gas turbine which comprises burning under pressure and at a high temperature fuel introduced in solid granular form into a combustion space in which a whirling of the gaseous contents is effected, removing furnace gases from the combustion space separately from molten ash centrifugally separated therefrom, tempering the removed furnace gases by the addition of gaseous fluid supplied under pressure and in quantity sufficient to solidify ash remaining in the furnace gases, separating ash in solid state before supplying the gases to a gas turbine, utilizing a portion of the heat generated in said combustion space to heat a fluid, generating vapor in a locality external to said combustion space by heat yielded by the heated fluid, and reheating the cooled fluid by heat from said combustion space while adding the vapor to the gases flowing to the turbine.

2. Apparatus for burning an ash-containing granulated fuel comprising an elongated cylindrical chamber defined by walls having a tangentially arranged inlet for fuel and air in one end portion and an outlet for gaseous products of combustion in its opposite end portion, a frusto-conical member positioned intermediate the inlet and outlet of said chamber and having its central opening axially arranged with respect to said chamber, and means defining a plurality of circumferentially spaced ports in the wall of said chamber positioned adjacent said frusto-conical member between said member and outlet and arranged to direct tangential streams of cooling fluid into the gaseous products of combustion discharge through the central opening of said frusto-conical member.

3. Apparatus for burning an ash-containing granulated fuel comprising a vertically elongated cylindrical chamber defined by refractory lined fluid cooled walls having a tangentially arranged inlet for fuel and air in its upper portion, a refractory covered fluid cooled frusto-conical member positioned intermediate the length of said chamber and having its central opening axially arranged with respect to said chamber, a plurality of circumferentially spaced ports in the wall of said chamber adjacent said frusto-conical member arranged to direct tangential streams of cooling fluid into the gaseous products of combustion discharged through the central opening of said frsuto-conical member, and a horizontally extending outlet duct for gaseous combustion products in the intermediate portion of and arranged to open downwardly coaxially with respect to said cooling chamber.

4. Apparatus for burning an ash-containing granulated fuel comprising a vertically elongated cylindrical chamber defined by refractory lined fluid cooled walls having a tangentially arranged inlet for fuel and air in its upper portion and an outlet for gaseous products of combustion in its lower portion, a fluid tight metallic casing radially spaced from and enclosing said walls to define an annular chamber therebetween, a refractory covered fluid cooled frusto-conical member positioned intermediate the height of said chamber and having its central opening axially arranged with respect to said chamber, and a plurality of circumferentially spaced ports in the refractory lined fluid cooled wall of said chamber positioned downwardly of said frusto-conical member and arranged to direct tangential streams of cooling fluid from said annular chamber into the gaseous products of combustion discharged through the central opening of said frusto-conical member.

5. Apparatus for burning an ash-containing granulated fuel comprising a vertically elongated cylindrical chamber defined by a plurality of upright circumferentially spaced wall tubes embedded in refractory material, means forming tangentially arranged inlets for fuel and air in the upper portion of said chamber, means forming an outlet for gaseous products of combustion in the lower portion of said chamber, horizontally disposed upper and lower annular headers encircling said chamber and connected by said wall tubes, a metallic casing radially spaced from and enclosing said wall tubes and headers, a frusto-conical member internally positioned intermediate the height of said chamber, means forming a plurality of circumferentially spaced ports between the wall tubes of said chamber adjacent said frusto-conical member arranged to direct tangential streams of tempering fluid into the gaseous products of combustion flowing through the central opening of said frusto-conical member, a horizontally disposed intermediate annular header spaced between said circumferentially spaced ports and said lower header, a plurality of upright finned tubes arranged between said wall tubes and casing and connecting said upper and intermediate headers, and a pump arranged for the forced circulation of fluid through said wall tubes and finned tubes.

6. Apparatus for burning an ash-containing granulated fuel comprising a vertically elongated cylindrical chamber defined by a plurality of upright circumferentially spaced wall tubes embedded in refractory material, means forming tangentially arranged inlets for fuel and air in the upper portion of said chamber, means forming an outlet for gaseous products of combustion in the lower portion of said chamber, horizontally disposed upper and lower annular headers encircling said chamber and connected by said wall tubes, a metallic casing radially spaced from and enclosing said wall tubes and headers, a frusto-conical member internally positioned intermediate the height of said chamber, means for cooling said member by the circulation of a cooling medium therethrough, means forming a plurality of circumferentially spaced ports between the wall tubes of said chamber adjacent said frusto-conical member arranged to direct tangential streams of tempering fluid into the gaseous products of combustion flowing through the central opening of said frusto-conical member, a horizontally disposed intermediate annular header spaced between said circumferentially spaced ports and said lower header, a plurality of upright finned tubes arranged between said wall tubes and casing and connecting said upper and intermediate headers, and a pump arranged for the forced circulation of fluid through said wall tubes and finned tubes.

7. Apparatus for burning an ash-containing granulated fuel comprising a vertically elongated cylindrical chamber defined by a plurality of upright circumferentially spaced wall tubes embedded in refractory material, means forming tangentially arranged inlets for fuel and air in the upper portion of said chamber, means forming an outlet for gaseous products of combustion in the lower portion of said chamber, horizontally disposed upper and lower annular headers encircling said chamber and connected by said wall tubes, a metallic casing radially spaced from and enclosing said wall tubes and headers, a frusto-conical member having a cooling tube coil embedded therein and positioned intermediate the height of said chamber to form an annular molten ash trap, means forming a plurality of circumferentially spaced ports between the wall tubes of said chamber adjacent said frusto-conical member arranged to direct tangential streams of tempering fluid into the gaseous products of combustion flowing through the central opening of said frusto-conical member, and means for passing cooling fluid through said tubes and tube coil.

8. Gas turbine plant adapted to operate on a solid ash-containing fuel comprising a chamber of substantially circular cross-section defined by a plurality of wall tubes embedded in refractory material, means forming tangentially arranged inlets for fuel and air in an end portion of said chamber, means forming an outlet for gaseous products of combustion in the opposite end portion of said chamber, spaced annular headers encircling said chamber and connected by said wall tubes, a metallic casing radially spaced from and enclosing said wall tubes and headers, a refractory covered frusto-conical member having a tube coil embedded therein and positioned intermediate the ends of said chamber, means adjacent said frusto-conical member arranged to direct tangential streams of tempering fluid into the gaseous products of combustion flowing through the central opening of said frusto-conical member, an external vapor generator, tubular connections between said headers and said external vapor generator for the circulation of fluid therebetween, a gas turbine arranged to receive the gaseous products of combustion passing through said chamber outlet, and a tubular connection from said vapor generator through the coil of said frusto-conical member to the gas turbine for superheating and mixing the vapor with the gaseous products of combustion.

9. Gas turbine plant adapted to operate on a solid ash-containing fuel comprising a vertically elongated cylindrical chamber defined by a plurality of upright circumferentially spaced wall tubes embedded in refractory material, means forming tangentially arranged inlets for fuel and air in the upper portion of said chamber, means forming an outlet for gaseous products of combustion in the lower portion of said chamber, horizontally disposed upper and lower annular headers encircling said chamber and connected by said wall tubes, a metallic casing radially spaced from and enclosing said wall tubes and headers, a refractory covered frusto-conical member having a tube coil embedded therein and positioned intermediate the height of said chamber, means adjacent said frusto-conical member arranged to direct tangential streams of tempering fluid into the gaseous products of combustion flowing through the central opening of said frusto-conical member, an external vapor generator, tubular connections between said headers and said external vapor generator for the circulation of fluid therebetween, a gas turbine arranged to receive the gaseous products of combustion passing through said chamber outlet, and a tubular connection from said vapor generator through the coil of said frusto-conical member to the gas turbine for superheating and mixing the vapor with the gaseous products of combustion.

CHRISTOPHER HUMPHREY DAVY.
THOMAS BASIL WEBB.

(References on following page)

REFERENCES CITED

The following references are of record in the file of this patent:

UNITED STATES PATENTS

| Number | Name | Date |
|---|---|---|
| 730,782 | Morrison | June 9, 1903 |
| 1,180,792 | Norrman | Apr. 25, 1916 |
| 1,197,456 | Dinsmore | Sept. 5, 1916 |
| 1,618,808 | Burg | Feb. 22, 1927 |
| 1,628,609 | Newhouse | May 10, 1927 |
| 1,657,698 | Schutz | Jan. 31, 1928 |
| 1,657,725 | Schutz | Jan. 31, 1928 |
| 1,918,397 | Jezler | July 18, 1933 |
| 2,055,385 | Noack | Sept. 22, 1936 |
| 2,357,303 | Kerr et al. | Sept. 15, 1944 |

FOREIGN PATENTS

| Number | Country | Date |
|---|---|---|
| 212,269 | Switzerland | Feb. 17, 1941 |
| 391,315 | France | Oct. 28, 1908 |